United States Patent
Sato et al.

(10) Patent No.: US 12,276,618 B2
(45) Date of Patent: Apr. 15, 2025

(54) DEFECT INSPECTION DEVICE

(71) Applicant: Hitachi High-Tech Corporation, Tokyo (JP)

(72) Inventors: Kazuhide Sato, Tokyo (JP); Yukihisa Mohara, Tokyo (JP); Masami Makuuchi, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 245 days.

(21) Appl. No.: 18/029,183

(22) PCT Filed: Oct. 30, 2020

(86) PCT No.: PCT/JP2020/040937
§ 371 (c)(1),
(2) Date: Mar. 29, 2023

(87) PCT Pub. No.: WO2022/091380
PCT Pub. Date: May 5, 2022

(65) Prior Publication Data
US 2024/0027361 A1    Jan. 25, 2024

(51) Int. Cl.
*G01N 21/93* (2006.01)
*G01N 21/88* (2006.01)
*G01N 21/95* (2006.01)

(52) U.S. Cl.
CPC ......... *G01N 21/93* (2013.01); *G01N 21/8806* (2013.01); *G01N 21/9501* (2013.01)

(58) Field of Classification Search
CPC ....... G01N 21/9501; G01N 2021/8896; G01N 2021/8887; G01N 21/8851; G01N 21/88;
(Continued)

(56) References Cited

U.S. PATENT DOCUMENTS 10,458,924 B2 * 10/2019 Kanai ................ G01N 21/9501
11,002,687 B2 *  5/2021 Hasegawa .............. G01N 21/94
(Continued)

FOREIGN PATENT DOCUMENTS

JP     62-239774 A    10/1987
JP     5-215696 A     8/1993
(Continued)

OTHER PUBLICATIONS

International Search Report (PCT/ISA/210) issued in PCT Application No. PCT/JP2020/040937 dated Jan. 19, 2021 with English translation (four (4) pages).
(Continued)

*Primary Examiner* — John R Lee
(74) *Attorney, Agent, or Firm* — Crowell & Moring LLP

(57) ABSTRACT

The purpose of the present disclosure is to provide a defect inspection device with which it is possible to suppress variation in an output signal occurring when an imaging operation condition for an image sensor is changed. The defect inspection device according to the present disclosure comprises a detector that outputs a detection signal for signal light generated by irradiating a sample with light. The detector is controlled so that a first operation state of the detector in a first signal acquisition condition and a second operation state of the detector in a second signal acquisition condition are the same.

9 Claims, 4 Drawing Sheets

(58) Field of Classification Search
CPC .. G01N 21/8806; G01N 21/956; G01N 21/95; G01N 21/93

See application file for complete search history.

(56) References Cited

U.S. PATENT DOCUMENTS

| | | |
|---|---|---|
| 11,287,375 B2 * | 3/2022 | Saito .................. G01B 11/30 |
| 2007/0268484 A1 | 11/2007 | Matsui |
| 2013/0010290 A1 | 1/2013 | Takahashi et al. |
| 2014/0268118 A1 | 9/2014 | Xu et al. |
| 2024/0027361 A1 * | 1/2024 | Sato .................. G01N 21/8806 |

FOREIGN PATENT DOCUMENTS

| | | |
|---|---|---|
| JP | 11-225252 A | 8/1999 |
| JP | 2007-149837 A | 6/2007 |
| JP | 2007-309713 A | 11/2007 |
| WO | WO 2011/122649 A1 | 10/2011 |

OTHER PUBLICATIONS

Japanese-language Written Opinion (PCT/ISA/237) issued in PCT Application No. PCT/JP2020/040937 dated Jan. 19, 2021 (three (3) pages).

* cited by examiner

DEFECT INSPECTION DEVICE

TECHNICAL FIELD

The present disclosure relates to a defect inspection device that inspects a defect of a sample using light.

BACKGROUND ART

In a semiconductor manufacturing process, an influence of a defect of a sample such as scratches or particles on a yield is considerable and feedback of inspection information of the defect in the defect inspection device back to the manufacturing process and a manufacturing apparatus is important in yield management. Accordingly, a role fulfilled by the defect inspection device inspecting the sample in the manufacturing process is decisive.

The following PTL 1 discloses a defect inspection device that scans an irradiation position of irradiation light in a spiral shape on the surface of a semiconductor wafer to inspect a defect by combining rotation movement θ which is main scanning and a straight advance (translation) movement R which is sub-scanning. In PTL 1, as an inspection result obtained by driving a rotation stage at a constant angular velocity and driving a straight advance stage at a constant linear velocity, a relative movement linear velocity of an irradiation spot to the surface of the wafer is larger in the outer circumference than in the inner circumference. Thus, since an irradiation time per dot is shorter in the outer circumference of the wafer than in the inner circumference, detection sensitivity deteriorates. In PTL 1, in focus on the problem, a position of an irradiation light spot on a stage is ascertained by an encoder or the like and irradiation light intensity in the outer circumference of the wafer is adjusted.

In a defect inspection device as in PTL 1, it is necessary to detect minute light intensity at high sensitivity. Therefore, an image sensor capable of converting an optical signal of a charge coupled device (hereafter, referred to as a CCD) or a complementary MOS (hereafter, referred to as a CMOS) into an electric signal with high efficiency is utilized as a defect detection device.

In the driving of the image sensor, supplying and stopping of a clock signal are repeated for each line period. At this time, when a current flowing to a driver between a clock stopping time and a clock supplying time is abruptly changed, a power voltage is changed between the clock supplying time and the clock stopping time. Accordingly, since an amplitude voltage of a driving signal of the image sensor is also changed, an output signal level of the image sensor is changed.

The following PTL 2 discloses a technology for solving such a change in an output signal level of an image sensor. In PTL 2, a dummy load that supplements a lack of power consumption caused due to deterioration in a load during a stopping period is included. A current is supplied to the dummy load during the stopping period so that the dummy load consumes power. Then, a difference in current can be decreased between the stopping period and an operation period to inhibit a change in the power voltage.

CITATION LIST

Patent Literature

PTL 1: JP2007-309713A
PTL 2: JPH11-225252A

SUMMARY OF INVENTION

Technical Problem

In a semiconductor defect inspection device, a plurality of imaging operation conditions (for example, high-sensitivity low-velocity imaging, low-sensitivity high-velocity imaging, changing of an imaging period for each inspection position, and the like) are switched in some cases. An output signal or the like of the image sensor is changed with a change in an imaging operation. Thus, even when the same target is imaged, an output signal from an image sensor differs before and after switching of an imaging operation. Therefore, there is a possibility of detection accuracy deteriorating.

For example, in an inspection mode in which a linear velocity (a movement velocity in a circumferential direction) of a stage is changed, irradiation light intensity is adjusted in accordance with the linear velocity to avoid wafer damage. Further, in order to inhibit a change in an output signal of a sensor following a change in the irradiation light intensity, an exposure time of the sensor is changed to cancel the change in the output signal. However, heating states of the sensor and a signal detection circuit are changed in accordance with the exposure time. An output signal of the sensor has temperature characteristics (that is, an output signal is changed depending on temperature), and thus there is a problem that the output signal is changed.

In a technology of the related art as in PTL 2, for example, when an imaging period of an inspection device is changed and an imaging operation is performed without providing a waiting time subsequently, an imaging operation performed continuously in a plurality of different operation conditions and an influence of the imaging operation are not assumed.

The present disclosure has been finalized in view of the foregoing problems and an object of the present disclosure is to provide a defect inspection device capable of inhibiting a change in an output signal generated when imaging operation conditions of an image sensor are changed.

Solution to Problem

According to the present disclosure, a defect inspection device includes a detector that outputs a detection signal for signal light generated by irradiating a sample with light. The detector is controlled so that a first operation state of the detector in a first signal acquisition condition is identical to a second operation state of the detector in a second signal acquisition condition.

Advantageous Effects of Invention

The defect inspection device according to the present disclosure is capable of inhibiting a change in an output signal generated when imaging operation conditions of an image sensor are changed. Problems, configurations, and advantageous effects other than the above description are apparent from description of the following embodiments.

DESCRIPTION OF EMBODIMENTS

First Embodiment

Figure 1:
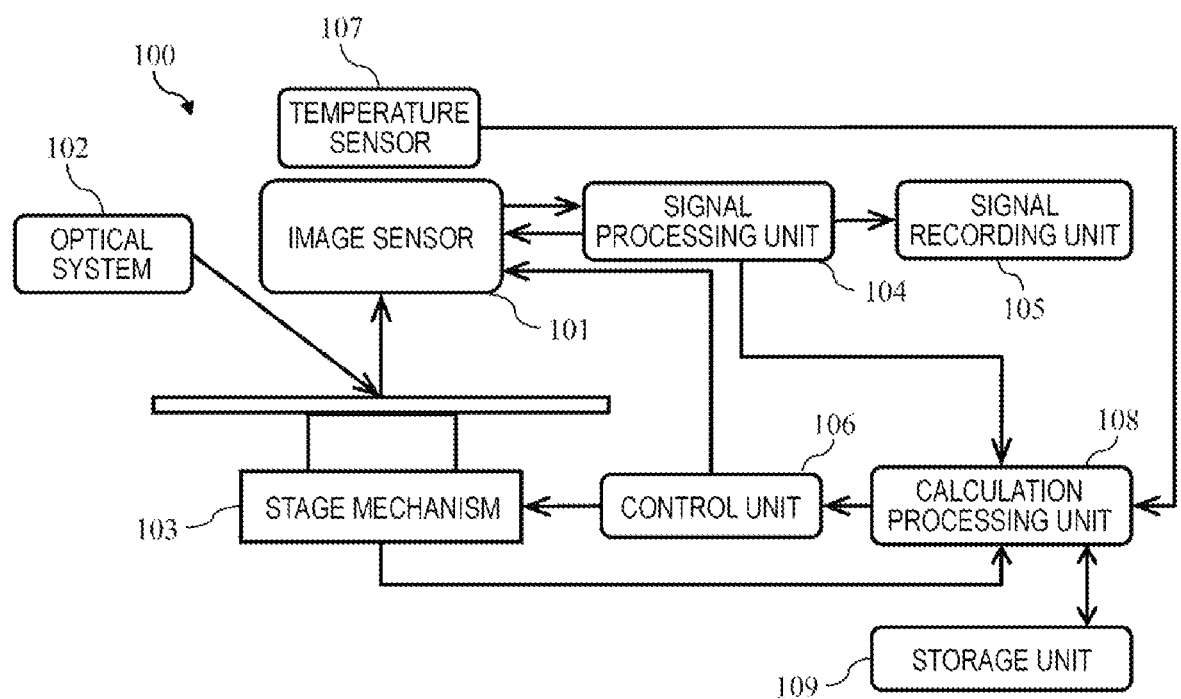
FIG. 1 is a diagram illustrating a configuration of a defect inspection device 100 according to a first embodiment.

FIG. 1 is a diagram illustrating a configuration of a defect inspection device 100 according to a first embodiment of the present disclosure. The defect inspection device 100 is a device that inspects a defect of a sample by irradiating the sample with light. The defect inspection device 100 includes an image sensor 101, an optical system 102, a stage mechanism 103, a signal processing unit 104, a signal recording unit 105, a control unit 106, a temperature sensor 107, a calculation processing unit 108, and a storage unit 109.

The image sensor 101 is an image sensor capable of controlling an operation condition of a sensor, including an exposure time from the outside of the sensor. As the image sensor, for example, a CCD, a CMOS, or the like can be considered. As described above, sensitivity of a general image sensor is known to have temperature characteristics originating mainly from an element or an internal driving circuit element of the sensor. To output a constant signal with respect to a certain amount of light, it is necessary to keep a sensor temperature constant.

The optical system 102 is an optical system that includes an irradiation optical system that has at least one light source. As the light source, for example, a laser, a light-emitting diode (LED), or the like is considered.

The stage mechanism 103 is a mechanism that moves a sample (a target that the optical system 102 images) placed on the stage mechanism 103. The stage mechanism 103 includes a stage that can perform at least translational movement and rotational movement and a Z stage that adjusts a height of a sample surface. In the following description, a circular semiconductor silicon wafer will be assumed as a sample.

The signal processing unit 104 processes a dark current or noise in an electric signal output from the image sensor 101 and performs signal processing such as sensitivity correction on each pixel. The signal processing unit 104 outputs an electric signal output from the image sensor 101 for each operation condition determined by the calculation processing unit 108 (to be described below) to the calculation processing unit 108 (to be described below).

The signal recording unit 105 records the electric signal output from the signal processing unit 104 or outputs the electric signal to an external storage device.

The control unit 106 controls an activation state of the image sensor 101 in accordance with an imaging operation condition of the image sensor 101 determined by the calculation processing unit 108 (to be described below) and controls the stage mechanism 103 such that the stage mechanism 103 is rotated at a predetermined circumferential velocity. A synchronization signal and operation conditions including a rotational operation velocity, a translational operation speed, and coordinates of the stage mechanism 103 are output to the calculation processing unit 108 (to be described below). As the operation conditions of the stage, for example, an operation of causing a circumferential velocity to be constant, an operation of causing a rotational velocity to be constant, and the like are considered.

The temperature sensor 107 is a temperature sensor that measures a temperature of at least any one portion in the image sensor 101 of which a temperature is changed in accordance with an imaging operation condition determined by the calculation processing unit 108 (to be described below). A heating state of the image sensor 101 in each of the measured operation conditions is output to the calculation processing unit 108.

The calculation processing unit 108 performs each of (a) an operation of acquiring a detection signal from the image sensor 101 under an operation condition A serving as a reference and (b) an operation of acquiring a detection signal from the image sensor 101 under at least one operation condition B different from the operation condition A. Examples of the operation conditions will be described below.

First Embodiment: Procedure in which Output Signal is Kept Constant

The image sensor 101 converts signal light (for example, reflected light or scattered light) generated by irradiating the sample with light from the optical system 102, from an optical signal into an electric signal (detection signal). The signal processing unit 104 processes a detection signal output by the image sensor 101. The signal processing unit 104 performs signal processing not originating from temperature, such as correction of a dark current for each pixel occurring in the image sensor 101. Results processed by the signal processing unit 104 are stored in the signal recording unit 105.

The calculation processing unit 108 records a correlation between (a) a signal recorded by the signal recording unit 105 and (b) an imaging operation condition of the image sensor 101 (a signal acquisition condition in which the calculation processing unit 108 acquires a detection signal from the image sensor 101) with respect to the same sample. The calculation processing unit 108 calculates a pseudo signal in which an output signal from the image sensor 101 is constant even in a different operation condition in accordance with the recorded correlation and records data describing a pattern of the pseudo signal in the storage unit 109 (or the signal recording unit 105). The pattern of the pseudo signal is calculated and recorded for each signal acquisition condition. The calculation processing unit 108 performs an imaging operation in accordance with the recorded pattern of the pseudo signal. An example of a procedure in which the pseudo signal is calculated will be described with reference to FIG. 4 to be described below.

Figure 2:
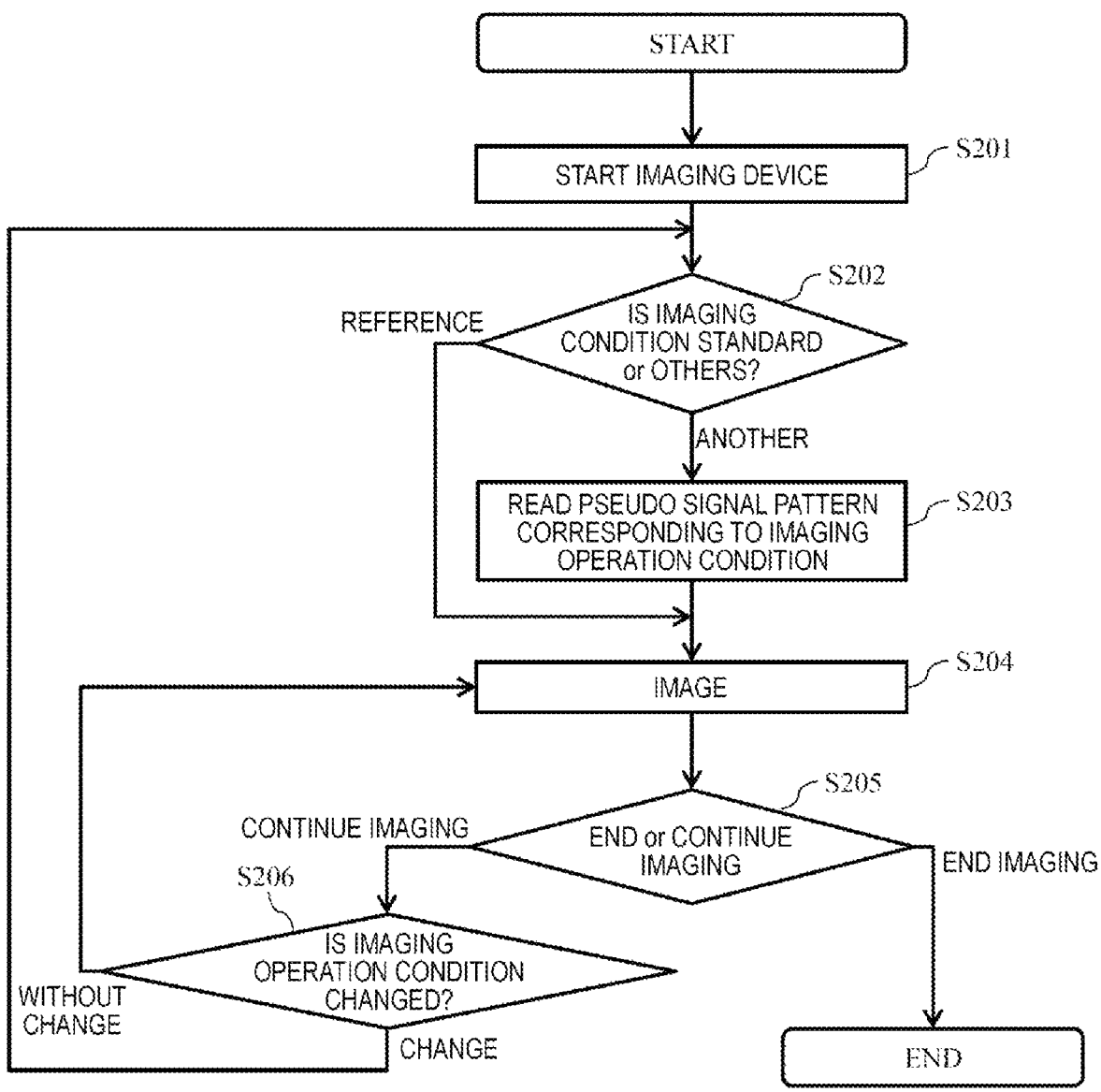
FIG. 2 is a flowchart illustrating a procedure when the defect inspection device 100 captures an image of a sample.

FIG. 2 is a flowchart illustrating a procedure when the defect inspection device 100 captures an image of a sample. Hereinafter, each step of FIG. 2 will be described.

(FIG. 2: Step S201)

A user powers on the defect inspection device 100 to start defect inspection device 100.

(FIG. 2: Step S202)

The calculation processing unit 108 determines whether the imaging operation condition is one of a reference operation condition and another operation condition. For example, the imaging operation condition can be designated through an interface by the user or can be determined in advance for each coordinate on the sample. When the imaging operation condition is determined in advance, data describing a regular imaging operation condition is stored in advance in the storage unit 109 and the calculation processing unit 108 determines an imaging operation condition in accordance with the data. When the reference operation condition is used, the process is skipped to S204. When another operation condition is used, the process moves to S203.

(FIG. 2: Step S203)

The calculation processing unit 108 reads the pattern of the pseudo signal corresponding to a present imaging operation condition from the storage unit 109.

(FIG. 2: Step S204)

The calculation processing unit 108 performs an imaging operation. The imaging operation is a series of operations in which the optical system 102 irradiates the sample with light, the image sensor 101 detects a signal light, and the calculation processing unit 108 processes a detection signal from the image sensor 101.

(FIG. 2: Step S205)

The calculation processing unit 108 determines whether the imaging operation ends. For example, when signal values are obtained for all coordinates on the sample, the imaging ends. When the imaging ends, the flowchart ends. When the imaging continues, the process moves to S206.

(FIG. 2: Step S206)

The calculation processing unit 108 determines whether the imaging operation condition is changed. When the imaging operation condition is not changed, the process returns to S204. When the imaging operation condition is changed, the process returns to S202. For example, when an instruction is given so that the user changes the imaging operation condition or another imaging operation condition is determined in advance to be used at subsequent imaging coordinates, the imaging operation condition is changed.

Figure 3:
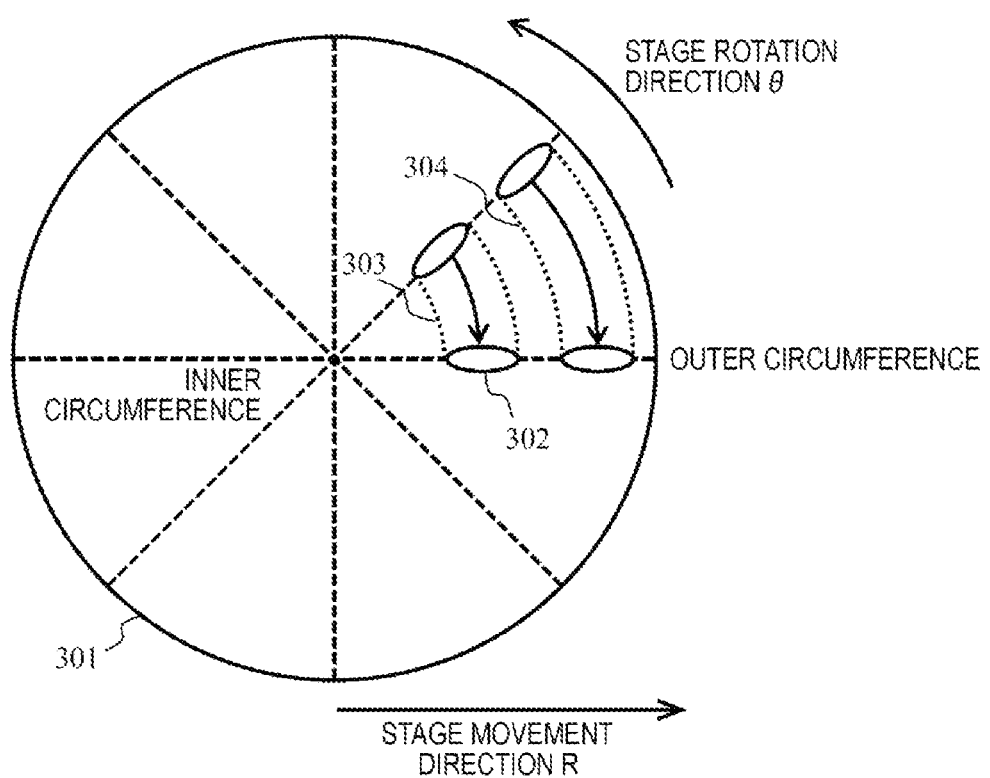
FIG. 3 is a diagram illustrating an example of an operation condition A serving as a reference and an imaging operation under any other operation condition B.

FIG. 3 is a diagram illustrating an example of the operation condition A serving as a reference and an imaging operation under any other operation condition B. For example, in an inspection mode in which a linear velocity (a movement velocity in a circumferential direction) of a sample-mounted stage 301 (a part of the stage mechanism 103) is faster in the outer circumference than in the inner circumference, an irradiation time of a beam per unit area in the beam irradiation region 302 differs between an inspection region 303 of the inner circumference and an inspection region 304 of the outer circumference. An imaging operation in the inner circumference is referred to as the operation condition B and an imaging operation in the outer circumference is referred to as the operation condition A. Accordingly, to avoid wafer damage, the control unit 106 adjusts light intensity output by the optical system 102 so that an amount of irradiation amount in an inspection area is constant between the operation conditions A and B according to the linear velocity. Further, to inhibit a change in an output signal of the image sensor 101 following a change in light intensity, the control unit 106 changes an exposure time of the image sensor 101 so that the change in the output signal is cancelled. Heating states of the image sensor 101 and a signal detection circuit are changed in accordance with the exposure time and an output signal is changed in accordance with temperature characteristics. Accordingly, the control unit 106 further causes the heating state of the image sensor 101 to be identical in the operation conditions A and B by the pseudo signal.

Figure 4:
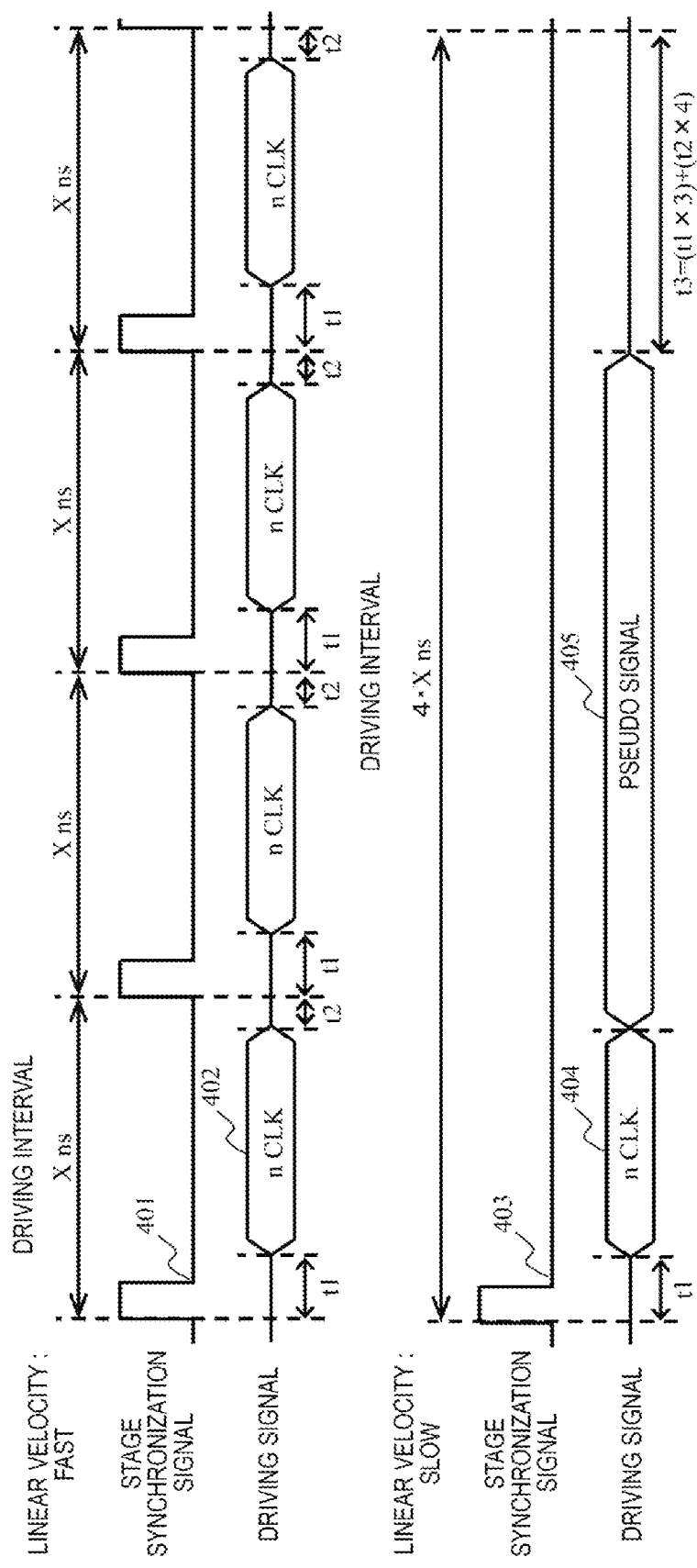
FIG. 4 is a diagram illustrating an example of a driving signal of an image sensor 101 under a reference operation condition and another operation condition.

FIG. 4 is a diagram illustrating an example of a driving signal of the image sensor 101 under the reference operation condition and another operation condition. It is assumed that the image sensor 101 detects signal light during reception of a driving signal output by the control unit 106 and does not perform a detection operation during other periods. The reference operation condition is referred to as the operation condition A and another operation condition is referred to as the operation condition B. The operation condition A corresponds to an imaging operation condition (the reference operation condition in FIG. 2) of the outer circumference in FIG. 3, and the operation condition B corresponds to an imaging operation condition (another operation condition in FIG. 2) of the inner circumference in FIG. 3.

In the operation condition A, the calculation processing unit 108 performs an imaging operation at each time interval Xns in accordance with a synchronous signal 401. The calculation processing unit 108 (and the control unit 106) outputs a driving signal 402 to the image sensor 101 when an imaging operation is executed. At this time, for a waiting time t1 after a rise of the synchronous signal 401, the imaging operation is not performed. After the imaging operation ends, a waiting time t2 is provided until a subsequent imaging operation.

In the operation condition B, the calculation processing unit 108 performs the imaging operation at each time interval 4·Xns in accordance with the synchronous signal 403. The calculation processing unit 108 (and the control unit 106) outputs a driving signal 404 to the image sensor 101 when the imaging operation is performed.

In the operation condition B, an inactive period of the image sensor 101 is longer and the temperature of the image sensor 101 is lower than in the operation condition A. Thus, the calculation processing unit 108 (and the control unit 106) gives a pseudo signal 405 to the image sensor 101 during a period in which the imaging operation is not performed so that an active period of the image sensor 101 and the signal processing circuit is equal between the operation conditions A and B. The pseudo signal 405 is used to activate the image sensor and the signal processing circuit (a state in which the signal light is acquired). Thus, since the image sensor 101 enters a heating state, the heating state of the image sensor 101 can be identical between the operation conditions A and B.

A time length in which the pseudo signal is given may be determined so that an activation time length (or an inactivation time length) of the image sensor 101 is equal between the operation conditions A and B. In an example illustrated in FIG. 4, since an inactive time of the operation condition A is 4×t1+4×t2, the time length of the pseudo signal may be determined so that the inactive time of the operation condition B is equal to the inactive time. In other words, a time length t3 in which a pseudo signal is not given can be calculated by t3=3×t1+4×t2. The calculation processing unit 108 calculates a pattern of the pseudo signal (that is, a time length) by this calculation expression.

In this way, the time length of the pseudo signal can be calculated for each signal acquisition condition in which the calculation processing unit 108 acquires the detection signal. That is, the time length of the pseudo signal may be determined so that a time length in which the image sensor 101 is driven is mutually equal between the signal acquisition conditions. A start timing of the pseudo signal may not be necessarily a timing immediately after the driving signal or may be a discrete signal in place of a continuous signal. That is, a time length in which the image sensor 101 is driven may be equal for each operation condition.

First Embodiment: Conclusion

The defect inspection device 100 according to the first embodiment controls the image sensor 101 such that (a) a heating state of the image sensor 101 when the calculation processing unit 108 acquires a detection signal from the image sensor 101 in the first signal acquisition condition (for example, in imaging of the outer circumference) is identical to (b) a heating state of the image sensor 101 when the calculation processing unit 108 acquires a detection signal from the image sensor 101 in a second signal acquisition condition (for example, in imaging of the inner circumference). Accordingly, even when a complicated inspection sequence in which an imaging operation condition of the image sensor is dynamically changed is used, it is possible to inhibit a change in an output signal generated in the image sensor 101.

When the image sensor 101 enters the driving state and a time interval at which the detection signal is output is long, the defect inspection device 100 according to the first embodiment additionally activates the image sensor 101 in accordance with an additional pseudo signal so that a heating state identical to the heating state in which the time interval is short is achieved. Accordingly, the heating state of the image sensor 101 can be caused to be identical between the signal acquisition conditions in which a driving time interval of the image sensor 101 is different.

When targets in which an element (for example, a size or the like) other than coordinates on the sample is the same are imaged in (a) and (b) below, the defect inspection device 100 according to the first embodiment calculates a pattern of a pseudo signal in which (a) a first detection signal acquired from the image sensor 101 by the calculation processing unit 108 in the first signal acquisition condition (for example, in imaging of the outer circumference) is identical to (b) a second detection signal acquired from the image sensor 101 by the calculation processing unit 108 in a second signal acquisition condition (for example, in imaging of the inner circumference), and stores the data describing the correlation between the pattern of the pseudo signal and the signal acquisition condition in the storage unit 109. The data may be stored in advance, for example, before shipment of the defect inspection device 100, or the correlation may be actually measured after the shipment and the data may be stored in the storage unit 109 based on the actually measured result. The defect inspection device 100 can cause the heating state of the image sensor 101 to be uniform for each signal acquisition condition by generating the pseudo signal in accordance with the data.

Second Embodiment

The defect inspection device 100 may perform a plurality of inspection modes in which a movement procedure of the stage mechanism 103 is different. For example, the following inspection modes are considered.

Inspection Mode 1: a mode in which a linear velocity of the sample on the stage is constant.

Inspection Mode 2: a mode in which an angular velocity of the sample on the stage is constant.

Inspection Mode 3: a mode in which a velocity of a sample on the stage is changed during imaging.

As an example of Inspection Mode 3, for example, a case in which both the angular velocity and the linear velocity are changed is considered. As a specific example, there is an inspection mode called an acceleration or deceleration inspection. The acceleration or deceleration inspection is an inspection mode in which an inspectable time can be utilized to the utmost in a total inspection time when a wafer is carried in to the defect inspection device 100, an inspection is performed, the inspection is ended, and then the wafer is carried out from the defect inspection device 100. Specifically, in an inspection mode other than the acceleration or deceleration inspection, rotation of the stage is started and the inspection is started after the number of rotations reaches a constant number necessary for the inspection, and a rotation velocity is decelerated after the inspection ends. However, the acceleration or deceleration inspection is an inspection mode in which the inspection is started in an acceleration stage before the number of rotations reaches the above-described constant number, deceleration is started from the constant number of rotations, and then the inspection is ended at an end timing of the inspection. The acceleration or deceleration inspection is an inspection mode that shortens the total inspection time by utilizing the acceleration/deceleration time of the stage as much as possible. In Inspection Mode 3, to improve imaging efficiency, the image sensor 101 detects signal light in some cases even when the sample is accelerated and the sample is decelerated. In an operation mode in which a movement velocity of the sample is changed in this way, a movement velocity of the sample differs in accordance with an acquisition timing of the detection signal. Therefore, there are operation conditions in which the driving time interval of the image sensor 101 is mutually different as in FIG. 4. When such inspection modes are used, the detection signal from the image sensor 101 can be caused to be uniform and therefore useful by using the scheme described in the first embodiment.

In other words, when the defect inspection device 100 performs at least one separate mode such as Inspection Mode 1 or 2 in addition to Inspection Mode 3, a movement velocity (that is, an imaging period) of the sample is changed variously as in FIG. 4. In the defect inspection device 100 in which the imaging period is changed variously in this way, there is the advantage of causing the operation state of the image sensor 101 to be uniform by applying the present disclosure.

Modified Example of Present Disclosure

The present disclosure is not limited to the above-described embodiments and includes various modified examples. For example, the foregoing embodiments have been described in detail to describe the present disclosure easily and the present disclosure is not limited to an embodiment in which all the above-described configurations are included. A part of a configuration of a certain embodiment can be substituted with a configuration of another embodiment and a configuration of another embodiment can also be added to a configuration of a certain embodiment. Addition, deletion, or substitution of another configuration can be made for a part of a configuration of each embodiment.

Some or all of the foregoing configuration, functions, processing units, processing methods, and the like (for example, the signal processing unit 104, the control unit 106, and the calculation processing unit 108) may be implemented by hardware, for example, by designing integrated circuits. The foregoing configurations, functions, and the like may be implemented by software by causing the control unit 106 to interpret and execute a program implementing each function. Information such as a program, a table, or a file implementing each function can be stored on a recording device such as a memory, a hard disk, a solid-state drive (SSD) or a recording medium such as an IC card, an SD card, or a DVD.

In the above drawings, control lines or data lines necessary for description are illustrated and all the control lines and data lines are not necessarily illustrated in terms of a product. Actually, it may be considered that most of all the configurations are connected to each other.

In the foregoing embodiments, the heating state of the image sensor 101 has been described as a factor for changing a detection signal from the image sensor 101. A change in a signal caused from another operation state of the image sensor 101 can also be caused to be uniform by using the present disclosure. For example, there is a case in which when an operation state of the image sensor 101 is changed, noise occurring from an electric circuit is changed and the change in the noise causes a change in the detection signal. It is considered that the noise can be caused to be uniform by equalizing the driving state of the image sensor 101 between the operation conditions. Accordingly, the change in the signal caused by the noise can be uniform with the pseudo signal described in FIG. 4. The same applies to a change in another signal occurring by changing the driving state of the image sensor 101.

In the foregoing embodiments, a semiconductor wafer has been given as an example of the sample, but the sample is not limited thereto. The present disclosure can be applied to a case as well in which a defect of another sample is inspected through light irradiation.

In the foregoing embodiments, the defect inspection device 100 may perform (a) generation of an image of a sample using a detection signal of signal light acquired by the image sensor 101 and inspection of a sample using the image or (b) inspection of a sample using a detection signal itself. In any case, the operation state of the image sensor 101 can be constant between the operation conditions by applying the present disclosure.

REFERENCE SIGNS LIST

100: defect inspection device
101: image sensor
102: optical system
103: stage mechanism
104: signal processing unit
105: signal recording unit
106: control unit
107: temperature sensor
108: calculation processing unit
109: storage unit

The invention claimed is:

1. A defect inspection device that inspects a defect of a sample by irradiating the sample with light, the defect inspection device comprising:
   a light source configured to irradiate the sample with the light;
   a detector configured to detect signal light generated by irradiating the sample with the light and output a detection signal indicating intensity of the signal light;
   a control unit configured to control an operation state of the detector; and
   a calculation unit configured to acquire and process the detection signal output by the detector,
   wherein the calculation unit acquires the detection signal related to the sample under a first signal acquisition condition,
   wherein the calculation unit acquires the detection signal related to the same sample for which the detection signal is acquired in the first signal acquisition condition under a second signal acquisition condition different from the first signal acquisition condition, and
   wherein the control unit controls the detector such that a first operation state of the detector in the first signal acquisition condition is identical to a second operation state of the detector in the second signal acquisition condition.

2. The defect inspection device according to claim 1, further comprising:
   a stage configured to move the sample placed on the stage,
   wherein the calculation unit acquires the detection signal for each first time interval when the stage moves the sample at a first velocity, as the first signal acquisition condition,
   wherein the calculation unit acquires the detection signal for each second time interval shorter than the first time interval when the stage moves the sample at a second velocity faster than the first velocity, as the second signal acquisition condition, and
   wherein the control unit controls the detector such that a first heating state of the detector in the first signal acquisition condition is identical to a second heating state of the detector in the second signal acquisition condition.

3. The defect inspection device according to claim 1, further comprising:
   a stage configured to rotationally move the sample placed on the stage,
   wherein the calculation unit acquires the detection signal for each first time interval as the first signal acquisition condition at a position located at a first distance from a rotation center of the stage,
   wherein the calculation unit acquires the detection signal for each second time interval shorter than the first time interval as the second signal acquisition condition at a position located at a second distance greater than the first distance from the rotation center, and
   wherein the control unit controls the detector such that a first heating state of the detector in the first signal acquisition condition is identical to a second heating state of the detector in the second signal acquisition condition.

4. The defect inspection device according to claim 2, wherein, when the calculation unit acquires the detection signal under the first signal acquisition condition, the control unit controls the detector such that the first heating state is identical to the second heating state by outputting a pseudo driving signal for activating the detector during a period of the first time interval to the detector.

5. The defect inspection device according to claim 1,
   wherein the detector is configured such that a heating state differs depending on a time interval at which the detector enters an activation state,
   wherein the control unit controls the time interval under at least any one of the first and second signal acquisition conditions so that a first output signal output by the detector in the first signal acquisition condition is mutually close to a second output signal output by the detector in the second signal acquisition condition, and
   wherein the control unit further controls the detector to compensate for the heating state of the detector changed by controlling the time interval such that the first output signal is mutually close to the second output signal.

6. The defect inspection device according to claim 5, wherein the control unit controls the detector such that a heating state of the detector in the first signal acquisition condition is identical to a heating state of the detector in the second signal acquisition condition by outputting a pseudo driving signal for activating the detector during a period of the time interval at the time interval longer between the first and second signal acquisition conditions to the detector.

7. The defect inspection device according to claim 1,
wherein the calculation unit acquires a first signal value of the detection signal in the first signal acquisition condition,
wherein the calculation unit acquires a second signal value of the detection signal in the second signal acquisition condition, and
wherein the calculation unit controls the detector such that the first operation state is identical to the second operation state by determining an operation condition of the detector in which the first signal value is identical to the second signal value.

8. The defect inspection device according to claim 7, further comprising:
a storage device configured to store data describing the operation condition of the detector in which the first signal value is identical to the second signal value,
wherein the control unit controls the detector such that the first operation state is identical to the second operation state by controlling the detector under the operation condition described by the data.

9. The defect inspection device according to claim 1, further comprising:
a stage configured to move the sample placed on the stage,
wherein the stage performs, as an operation mode, a velocity change mode in which a velocity at which the sample is moved is changed during an imaging period in which the detector acquires the detection signal,
wherein, in addition to the velocity change mode, the stage is configured to perform, as an operation mode, at least any one of a constant linear velocity mode in which a linear velocity at which the sample is moved is constant and a constant angular velocity mode in which an angular velocity at which the sample is moved is constant, and
wherein, when the stage performs the velocity change mode, the control unit controls the detector such that the first operation state is identical to the second operation state.

* * * * *